(12) United States Patent
Mattsson et al.

(10) Patent No.: US 7,348,710 B2
(45) Date of Patent: Mar. 25, 2008

(54) ROBUST ELECTROMECHANICAL MOTOR

(75) Inventors: Christer Mattsson, Norrtälje (SE);
Stefan Johansson, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 0 days.

(21) Appl. No.: 11/262,797

(22) Filed: Nov. 1, 2005

(65) Prior Publication Data

US 2007/0096599 A1    May 3, 2007

(51) Int. Cl.
*H01L 41/053*    (2006.01)
*H01L 41/09*    (2006.01)
*H02N 2/04*    (2006.01)

(52) U.S. Cl. ............ 310/328; 310/323.02; 310/323.05; 310/323.17

(58) Field of Classification Search ................ 310/328, 310/323.01, 323.02, 323.03, 323.04, 323.05, 310/323.17, 316.02, 311, 12; 384/1
See application file for complete search history.

(56) References Cited

U.S. PATENT DOCUMENTS

| | | | | | |
|---|---|---|---|---|---|
| 4,777,398 | A | * | 10/1988 | Shibuya | ...................... 310/328 |
| 5,389,845 | A | * | 2/1995 | Brimhall | ...................... 310/26 |
| 5,596,241 | A | | 1/1997 | Seki et al. | |
| 5,646,469 | A | * | 7/1997 | Tsukimoto et al. | ..... 310/323.01 |
| 5,812,330 | A | * | 9/1998 | Akada | ........................ 359/823 |
| 5,945,771 | A | | 8/1999 | Kimura et al. | |
| 6,037,702 | A | * | 3/2000 | Tamai | ................... 310/323.06 |
| 6,215,605 | B1 | * | 4/2001 | Kuwana et al. | ............. 359/824 |
| 6,218,767 | B1 | | 4/2001 | Akada et al. | |
| 6,611,080 | B2 | * | 8/2003 | Ngol et al. | ............ 310/323.02 |
| 6,720,707 | B2 | * | 4/2004 | Tamai et al. | ........... 310/323.12 |
| 7,026,746 | B2 | * | 4/2006 | Audren et al. | ............... 310/328 |
| 2002/0050765 | A1 | * | 5/2002 | Magnussen et al. | ... 310/323.16 |
| 2002/0149297 | A1 | * | 10/2002 | Yamamoto et al. | ......... 310/328 |
| 2003/0234596 | A1 | | 12/2003 | Johansson et al. | |
| 2006/0055285 | A1 | * | 3/2006 | De Vries et al. | ............ 310/328 |

OTHER PUBLICATIONS

U.S. Appl. No. 11/049,956, filed Feb. 4, 2005, Danell.

* cited by examiner

*Primary Examiner*—Darren Schuberg
*Assistant Examiner*—Derek Rosenau
(74) *Attorney, Agent, or Firm*—Young & Thompson

(57) ABSTRACT

An electromechanical motor includes a rail to be moved, a dry, non-lubricated, sliding bearing for the rail, and driving members imposing a mechanical driving force on the rail. The bearing has two rail contacting portions. A first portion contacts the rail for obstructing displacements of the rail in a first direction transverse to a main extension of the rail. The first portion also obstructs rotation of the rail around an axis parallel to the main extension. The second portion is arranged for obstructing displacements of the rail in the first direction transverse to the main extension, while allowing at least a minor movement of at least one of rotation of the rail. The motor allows for mechanical flexibility at certain selected positions and ensures immobility at other selected positions, in order to reduce the impact of externally induced displacements, torques and rotations at critical places in the motor.

28 Claims, 7 Drawing Sheets

ROBUST ELECTROMECHANICAL MOTOR

TECHNICAL FIELD

The present invention relates in general to small electromechanical motors.

BACKGROUND

Micromotors based e.g. on utilization of the piezoelectric effect are used in many different applications today. The motors have a typical size from a couple of millimeters to a couple of centimeters and are therefore very suitable for small size applications. The motors are typically driven utilizing an interaction between a rotor or shuttle and a driving element. The driving principle is in many applications based on ultrasonic resonances, but also driving principles based on walking, stepping, stick-slip mechanisms etc. are also commonly occurring. The drive elements are typically fixed against a motor housing, which typically in turn are fixed against a support on the device in which the created motion is to be provided. The rotor or shuttle is typically attached to a movable part of the device. This movable part is thus given a corresponding movement as the rotor or shuttle.

Small sizes of the part of the devices and small displacements of the movable parts put severe requirements on tolerances at mounting and operation. Even relatively small errors in dimensions and positions may severely influence the operation of the motor, since deflections and torsions between the shuttle/rotor and the driving elements strongly influence the interaction there between. Small errors in mounting precision may deform or even break bearings or other parts of the motor. As a result, a standard solution is to require extreme fine tolerances on many parts of the motor, which unfortunately results in high manufacturing costs and complex manufacturing procedures.

Moreover, the driving elements of electromechanical motors are driven by supplying different electrical signals to the active elements. Such electrical signals have to be supplied in some way, typically by an electrical connection, such as a cable. During mounting and operation, it is relatively common that such an electrical connection is exposed for external forces, and mechanical protective means for preventing any electrical contacts to be exposed to large mechanical forces have to be provided. However, such protective means in small sizes are difficult to provide and increase the manufacturing costs even further.

Mounting is typically the most costly part of the manufacturing of micromotors, and in particular the final mounting on the devices to be controlled. Precision for mounting and difficulties in cooperation with additional parts as e.g. sensors are well known areas of problems. All such problems typically sum up in expensive manufacturing of micromotors.

SUMMARY

A general problem with micromotors of prior art is that requirements on precision and fine tolerances result in expensive manufacturing.

A general object of the present invention is thus to provide electromechanical motors with improved design allowing for more cost-efficient manufacturing. A further object of the present invention is to provide electromechanical motors adapted for a facilitated precision mounting. In particular, an object is to design for manufacturing of integrated parts where suitable, while providing for precision module mounting where required. Another further object of the present invention is to provide electromechanical motors that are more robust against errors in mounting and/or errors in handling. In particular, an object is to reduce the effects of mounting and/or handling errors on the actual operation of the motor.

The above objects are achieved by electromechanical motors according to the enclosed patent claims. A principle utilized in the present invention is to allow for mechanical flexibility at certain selected positions and to ensure immobility at other selected positions, in order to reduce the impact of externally induced displacements, torques and rotations at critical places in the motor. In general words, an electromechanical motor comprises a rail to be moved, a dry, non-lubricated, sliding bearing for the rail, and driving members imposing a mechanical driving force on the rail. The bearing has two rail contacting portions. A first rail contacting portion is in contact with the rail for obstructing displacements of the rail in a first direction transverse to a main extension of the rail. The first rail contacting portion also obstructs rotation of the rail around an axis parallel to the main extension. The second rail contacting portion is instead arranged for obstructing displacements of the rail in the first direction transverse to the main extension of the rail, while allowing at least a minor rotation of the rail relative to the second rail contacting portion in at least one direction.

In particular embodiments, the rail has at least one pair of plane-parallel sides, against which the rail contacting portions are supporting. The first rail contacting portion has preferably at least a line contact, while the second rail contacting portion preferably presents point contacts. The rail contacting portions are preferably manufactured by injection-molding and preferably as an integral part of the housing. In preferred embodiments, the driving means are mounted on flexible printed circuit boards in order to provide both mounting flexibility perpendicular to the rail surface, rigidness in other directions and robust electrical connections.

One advantage with the present invention is that manufacturing costs for electromechanical motors can be reduced significantly.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present disclosure, a motor based on piezoelectric drive elements is used as an example during the detailed description. However, anyone skilled in the art realizes that the same principles are applicable also to other electromechanical driving principles as well. Likewise, even if the exemplary motor of the present disclosure is a linear motor, similar principles are also applicable to rotating motors. The moving part of the motor, i.e. in the linear case the shuttle, is in the present disclosure denoted by "rail". This term "rail" should not imply any unreasonable limitations, but should instead be understood as "the body to be moved", regardless of the actual shape.

Figure 1:
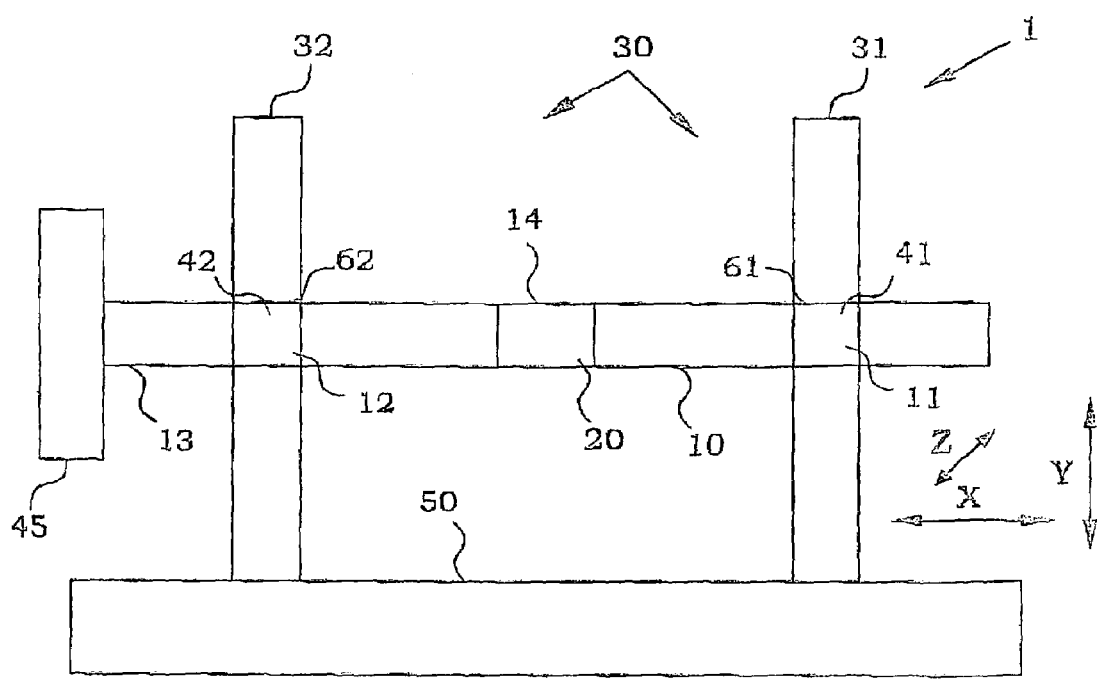
FIG. 1 is a schematic illustration of a sliding bearing in a micromotor.

FIG. 1 illustrates a simplified illustration of a linear motor 1, comprising a rail 10, relative which a driving element 20 applies a driving force in a direction X. Direction X is in FIG. 1 illustrated as the direction left-right and coincides with a main extension of the rail 10. A direction Z is defined as a direction substantially perpendicular to the surface of the rail 10 on which the driving element 20 operates. Direction Z is therefore transverse to the main extension X of said rail 10. A direction Y is finally defined as substantially perpendicular to both directions X and Z, i.e. the height dimension in FIG. 1. The direction Y is thus transverse to both the main extension X of the rail and transverse to the direction Z.

The rail 10 is mounted by a bearing, generally denoted by 30, comprising a first rail contacting portion 31 and a second rail contacting portion 32. The rail 10 is typically supported by a mechanical static or sliding contact with inner surfaces 61, 62 of the first rail contacting portion 31 and the second rail contacting portion 32, respectively. A front end 13 of the rail 10 is attached to an external movable part 45, to which the motion of the motor is going to be transferred. The bearing 30 is attached to a housing 50 of the motor 1. Also the driving element 20 is by its rear end directly or indirectly attached to the housing 50 (not shown).

The motor output force will be reduced when the friction between the bearing 30 and the rail 10 is increased. The rail contacting portions 31, 32 are therefore designed so that there is a certain mechanical play between the inner surfaces 61, 62 and the rail 10 when all components are in their ideal position. The manufacturing tolerances of the respective parts are included in this play. The play should be large enough to avoid undesired friction between the inner surfaces and the rail. In most motors the play can, however, not be made too large since the operation of the driving element 20 might be affected negatively and therefore other solutions than simply increasing the play has to be found. The present invention presents several embodiments of a solution to reduce undesired friction effects.

Figure 2:
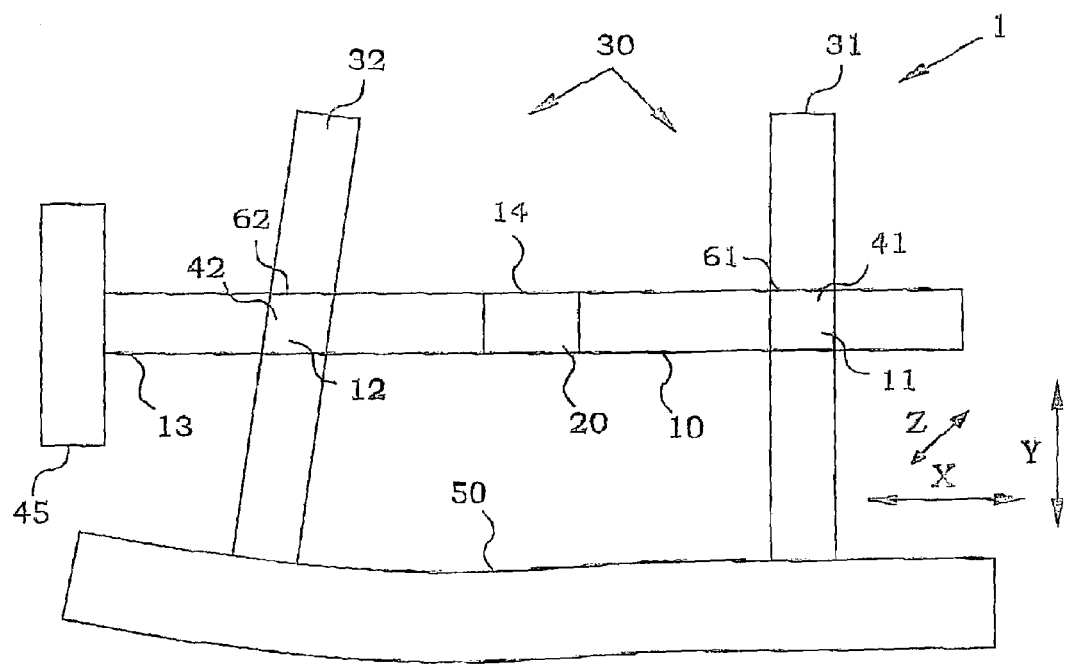
FIG. 2 is a schematic illustration of the displacement acceptance for an embodiment of the present invention.

FIG. 2 illustrates an embodiment of a motor according to the present invention. As before, the bearing 30 comprises the first rail contacting portion 31 and the second rail contacting portion 32. The rail 10 is typically supported by a mechanical static or sliding contact with inner surfaces 61, 62 of the first rail contacting portion 31 and the second rail contacting portion 32, respectively. The inner surfaces 61, 62 thereby define respective hollow volumes 41, 42, through which the rail is positioned.

FIG. 2 shows a situation, where the manufacturing of the motor housing 50 has resulted in a slight tilting of the rail contacting portions 31, 32 relative each other. The resulting shape changes are extremely exaggerated in the figure to emphasize the effects. A tilting of the rail contacting portions will not influence the friction between the rail 10 and the rail contacting portions 31, 32 as long as there is some remaining play between the inner surfaces 61, 62 and the rail. However, when the play disappears due to excessive tilting, the friction increases rapidly and the output force of the motor is significantly decreased. In other words, if the rotation of the rail 10 with respect to the rail contacting portions 31, 32 is larger than what is admitted with the designed play, the rail 10 will come into contact with the rail contacting portions 31, 32 at points situated on opposite sides of the rail 10. This causes a drastic increase in the friction.

If the play in the rail contacting portions 31, 32 would be increased, the corresponding displacement possibility of the rail 10 typically results in a deteriorated operation, since the ideal operations conditions at the driving portion 14 are disturbed. If the displacement would be directed in the Z direction, the influence on the driving conditions would probably be even worse, since displacements are occurring in the contact force direction, which typically is more sensitive.

Moreover, if the external movable part 45 imposes a rotation R of the rail 10 around an axis parallel to the main extension X of the rail 10, also this will probably cause difficult operational disturbances, in particular when a resonant piezoelectric drive element is used. The alignment of the drive element 20 of a piezoelectric motor, e.g. according to the principles discussed in the U.S. patent application Ser. No. 11/049,956, hereby incorporated by reference, is essential for proper operation. Here it is shown how smaller alignment errors can be compensated for by self-aligning configurations. Even if a partially self-aligning drive element support is used, excessive displacement or rotation will anyway result in deteriorated operation.

In cases where the rail 10 is weaker, consists of assembled parts etc., also the rail 10 may be subject of deformation. The result will eventually be the same, since it is the relative conditions between the rail contacting portions 31, 32 and the rail 10 that are of importance.

The first rail contacting portion 31 is arranged for providing a rigid support to the rail 10 at the position of the first rail contacting portion 31. In particular, the inner surface 61 is shaped for obstructing displacements of the rail 10 in the Z direction. Preferably, the inner surface 61 is also shaped for obstructing rotation of the rail 10 around an axis parallel to the main extension X of the rail 10 that goes beyond what an appropriate play allows. In other words, the inner surface 61 is shaped for obstructing excessive displacements of the rail 10 in the Z direction and preferably as well as for obstructing excessive rotation of the rail 10 around an axis parallel to the main extension X of the rail 10. Preferably, the inner surface 61 is further shaped also for obstructing displacements of the rail 10 in the Y direction. A portion 11 of the rail 10 situated in the hollow volume 41 will thereby be kept in an essentially non-displaced position, i.e. within acceptable displacement tolerances for the piezoelectric drive element.

The second rail contacting portion 32 could be equal to the first rail contacting portion 31 but is in a preferred embodiment different from the first rail contacting portion 31. The second rail contacting portion 32 is then instead arranged for providing a rigid displacement support to the rail at the position of the second rail contacting portion 32, while being flexible against tilting and rotation. Tilting of one of the rail contacting portions relative the other rail contacting portion will result in a rotation of the inner surface 61, 62 relative the rail 10. There might be rotations around all three axes X, Y and Z. The inner surfaces 61, 62 are shaped for obstructing displacements of the rail 10 in the Z direction. The inner surface 62 is in contrast to inner surface 61 arranged for allowing a minor excessive rotation movement, i.e. relative rotation movements, larger than those allowed due to the designed mechanical play, between the rail and the second rail contacting portion 32. In particular, at least one of a rotation of the second rail contacting portion 32 around the axis parallel to the main extension X of said rail 10, and a tilting of the second rail contacting portion 32 is allowed (i.e. a relative rotation around an axis along the Y or Z direction). In preferred embodiments, all these movements are allowed. In further preferred embodiments, the inner surface 62 is arranged for obstructing displacements of the rail 10 in the Y direction, while allowing a minor tilting of the second rail contacting portion 32 in the Y direction (i.e. a relative rotation around an axis along the Z direction).

A portion 12 of the rail 10 situated in the hollow volume 42 will thereby be kept in position, while being allowed to rotate or tilt somewhat. Such rotation and/or tilting will accommodate smaller manufacturing errors or deformations due to external forces on the motor housing, thereby reducing the risk for uncontrolled deformation or breakage of the bearing 30 and prohibiting or at least mitigating increased friction.

At the same time, the rigid support in the first rail contacting portion 31 will reduce the effects of tilting and rotation at the driving portion 14 of the rail 10, thereby ensuring a reliable operation. This combination of rigidity and flexibility at different portions of the rail 10 provides robustness to the entire arrangement.

When taking a predefined play into account, the second rail contacting portion is arranged for obstructing displacements of the rail in a first direction transverse to the main extension of the rail larger than the predefined play, while allowing at least a minor rotation of the rail relative to the second rail contacting portion in excess of what the predefined play allows.

Figure 3A:
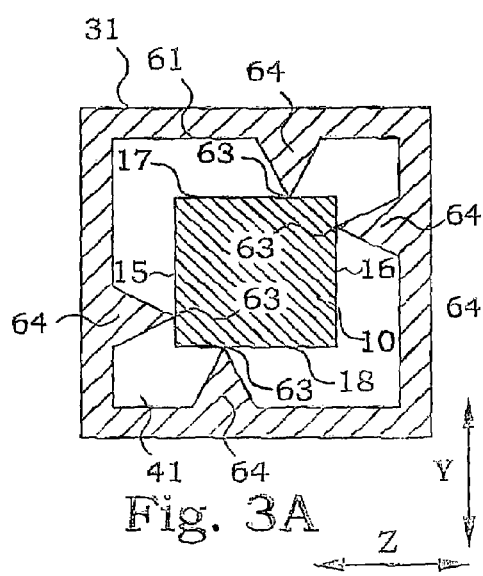
FIGS. 3A-G are schematic embodiments of a first rail contacting portion according to the present invention.

The actual shape of the rail contacting portions 31, 32 of the sliding bearing 30 can be designed in different ways. FIGS. 3A-G illustrate some examples of shapes usable for the first rail contacting portion 31. FIG. 3A illustrates a cross-sectional view of one embodiment of a first rail contacting portion 31. The inner surface 61 presents in this embodiment protruding portions 64 protruding into the hollow volume 41, coming into contact with the rail 10. The hollow volume 41 is in this embodiment a closed hollow volume, i.e. the inner surface 61 encircles the entire hollow volume 41. The rail 10 has in the present embodiment a rectangular cross-section, presenting two pairs of plane-parallel sides 15, 16; 17, 18. The protruding portions 64 provide a point contact 63 at each of the four sides 15-18, which prevents displacements as well as rotations.

Figure 3B:
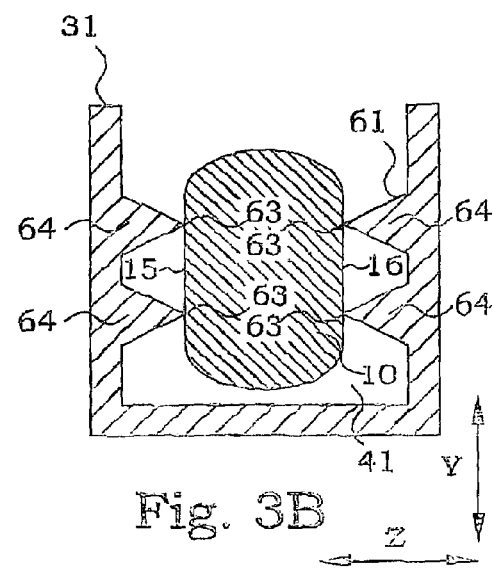

In FIG. 3B, a rail 10, having a rounded cross-sectional shape is illustrated. The rail 10 presents two plane-parallel sides 15, 16, connected by a rounded upper and lower part. The inner surface 61 also here comprises protruding portions 64, in this embodiment two at each side of the rail 10. The protruding portions 64 creates two point contacts 63 on each side 15, 16 of the rail, thereby also preventing rotations as well as displacements in the Z direction. This embodiment shows however an open hollow volume 41, which does not provide restrictions in the Y direction.

Figure 3C:
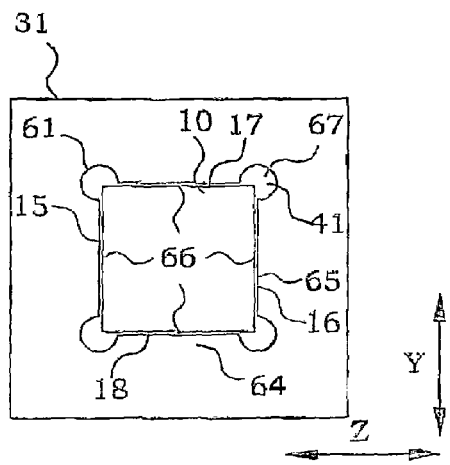

FIG. 3C illustrates a presently preferred embodiment of a first rail contacting portion 31. The hatching is removed and only one reference figure of each number is shown in order to increase the figure readability. In this embodiment, the rail 10 presents four plane sides 15-18. The inner surface 61 comprises protruding portions 64, but now with a flat top 65, which is in conformity with the rail sides 15-18. The flat top 65 thus provides a line contact 66 with the rail 10, transverse to the main extension of the rail 10. The line contact 66 can also be viewed as a number of overlapping point contacts. The prevention of rotations and displacements in the Z and Y directions is very steady in the present embodiment. The protruding portions 64 of the first rail contacting portion 31 of the embodiment of FIG. 3C do not extend all the way along the rail sides 15-18. Instead, cavities 67 are provided at the corners of the hollow volume 41. These cavities 67 thus provide a space relative the corners of the rectangular cross section of the rail 10, i.e. the rail edges. Such cavities 67 can easily accommodate irregularities at the rail edges, which may be present e.g. as a result of the manufacturing process, for example minor chips or bumps. The cavities 67 allow for very sharp edges of the rail 10 since even a small radius of the corners in a hollow rectangular volume 41 would result in increased friction.

Figure 3D:
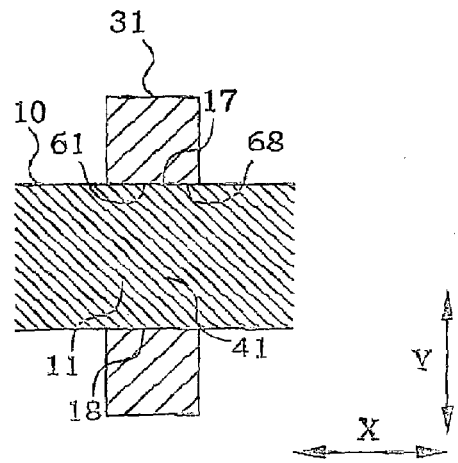

FIG. 3D illustrates a cross-sectional view of an embodiment of a first rail contacting portion 31 taken along the axis of the rail 10. The inner surface 61 is here flat over the hollow volume 41, contacting the surface 17, 18 of the rail 10 over essentially the whole portion 11. Such an arrangement becomes very stable against tilting the rail portion 11 within the hollow volume 41, since a two-dimensional area contact 68 is created. The area contact 68 can also be viewed as a number of overlapping line contacts. However, there is a risk for jamming the rail 10 in the hollow volume 41.

Figure 3E:
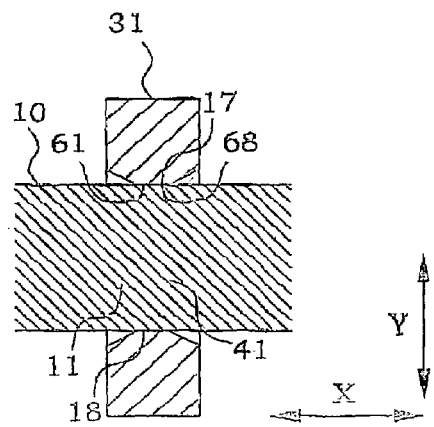
Figure 3F:
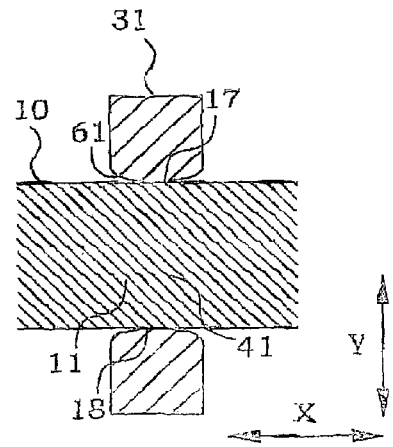
Figure 3G:
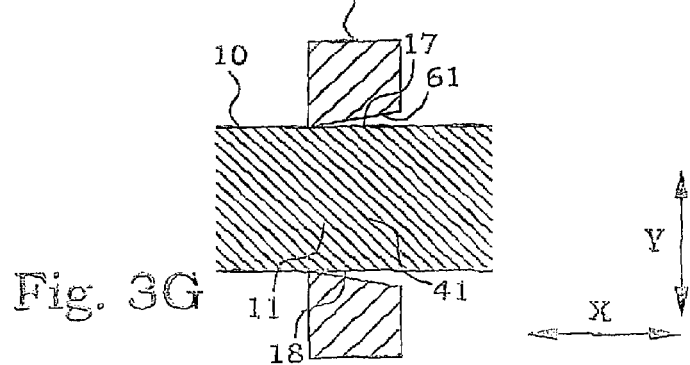

FIG. 3E illustrates another embodiment, where the flat part of the inner surface 61 does not extend over the entire portion 11. Such an arrangement reduces the risk for jamming, however, the stability against tilting is reduced. In cases where tilting is not very severe, the extension of the area contact 68 can be even further reduced. In FIG. 3F, the inner surface 61 is vaulted in the X direction, i.e. along the main extension of said rail 10. In FIG. 3G, the inner surface 61 is inclined in the X direction, presenting a point contact or line contact at an edge of the first rail contacting portion 31.

By designing the first rail contacting portion 31 with an angle at the contact point, the first rail contacting portion 31 can additionally be used to remove any impurities from the surface of the rail 10. Such impurities may e.g. comprise wear debris from the driving element or rail during the operation. Excess material present on the surface of the rail may change the friction conditions considerably. Depending on the specific situation, both increased and decreased friction coefficients may be the result.

Figure 4A:
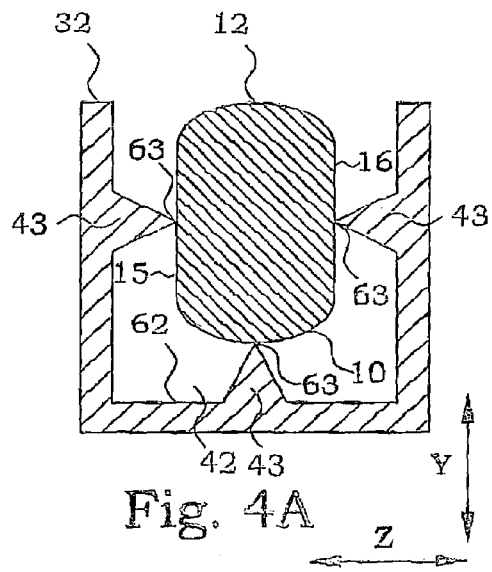
FIGS. 4A-E are schematic embodiments of a second rail contacting portion according to the present invention.

FIGS. 4A-E illustrate some examples of shapes usable for the second rail contacting portion 32, i.e. the part of the bearing that preferably is closest to the part where any external devices are attached. In FIG. 4A, a rail 10 in the same shape as in FIG. 3B is illustrated. The inner surface 62 presents protruding portions 43, contacting the rail 10 at point contacts 63. The hollow volume 42 is here open and the displacement in the Y direction is only prohibited by a support of one of the protruding portions 43. The rail portion 12 in the hollow volume 42 is here allowed to rotate somewhat around the rail axis.

Figure 4B:
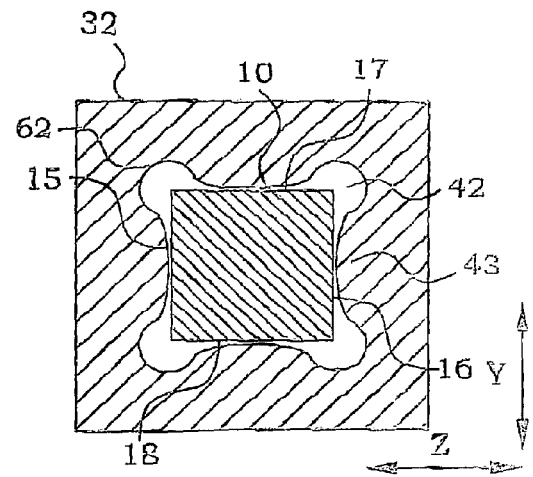

In FIG. 4B, in a presently preferred embodiment, the protruding portions 43 are rounded off, which provides a more gentle interaction with the second rail contacting portion 32. Also here, a minor rotation around the rail axis is permitted. Furthermore, the second rail contacting portion 32 encircles in this embodiment the hollow volume 42, and prevents the rail 10 from all displacements also in the Y direction.

Figure 4C:
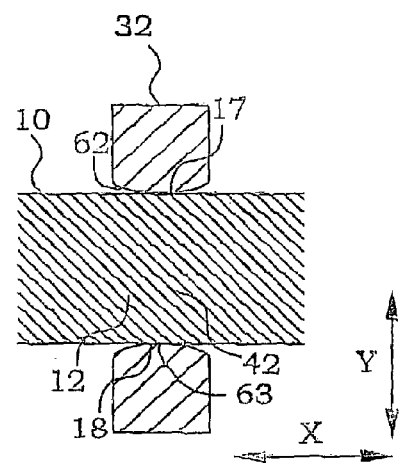
Figure 4D:
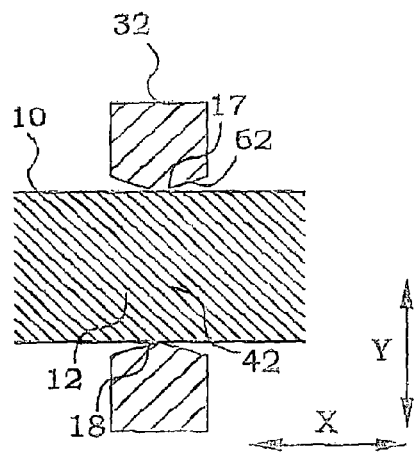
Figure 4E:
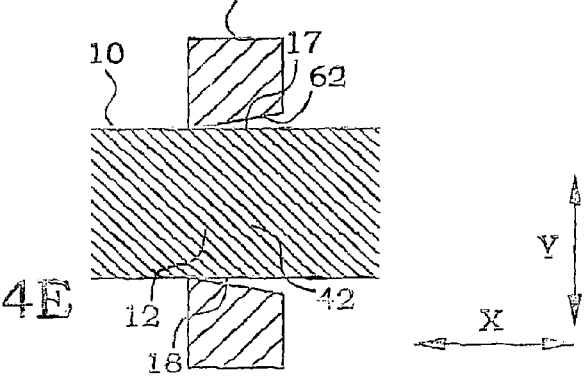

FIG. 4C illustrates the second rail contacting portion 32 in another cross-sectional view. One can here see that in order to allow for tilting the rail contacting portion somewhat, the extension of the contact point 63 along the rail 10 is kept small. The inner surface 62 is here vaulted in the X direction, i.e. along the main extension of said rail 10. In FIG. 4D the inner surface 62 is inclined in the X direction, presenting a point contact at an edge of the second rail contacting portion 32. In FIG. 4E, the inner surface presents an angle shape in the X-direction. This can also help in cleaning the rail from worn material during the driving operation.

Figure 5:
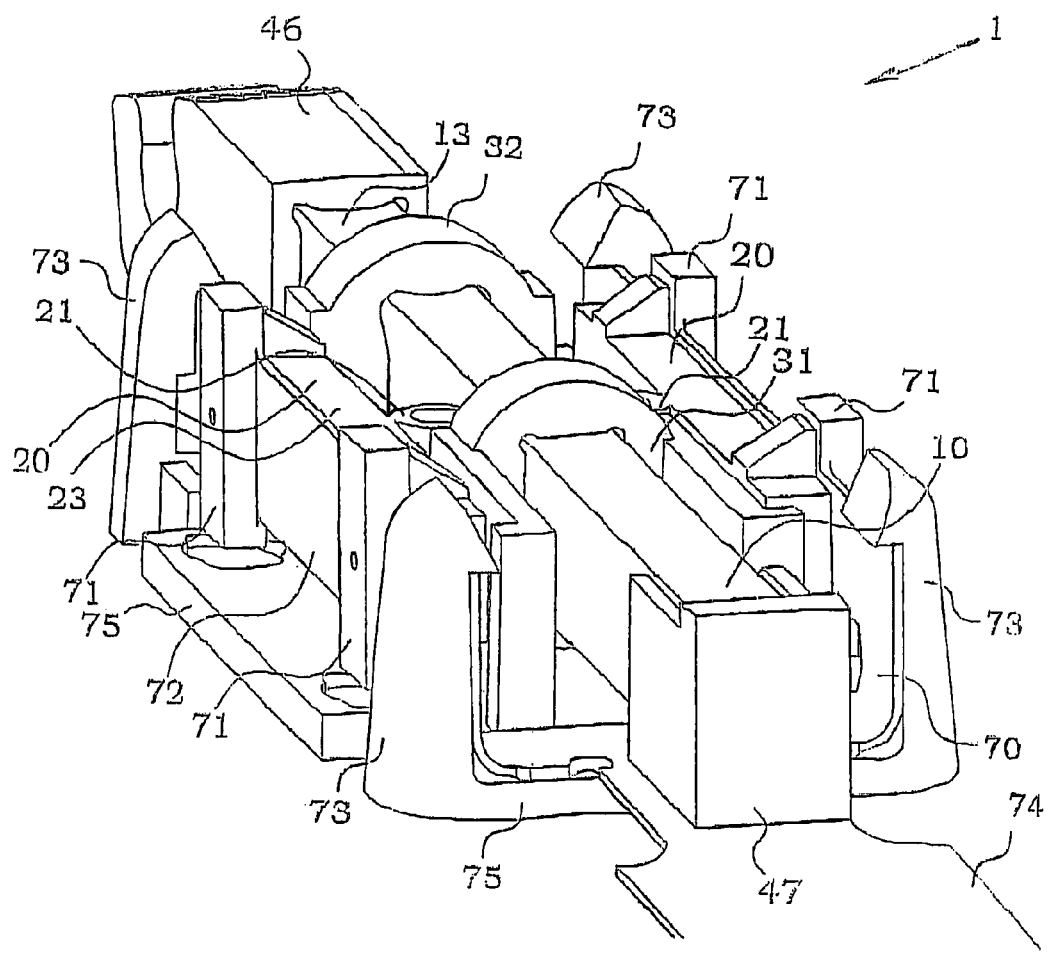
FIG. 5 is an elevation view of a preferred embodiment of an electromechanical motor according to the present invention with cover and spring removed.

An embodiment of a motor according to the present invention is illustrated in an elevation view in FIG. 5, with a spring and cover removed. The scale is much enlarged in order to show the details. The entire motor assembly is in reality just about 15 mm long. The rail 10 is provided with a stopper 47 at the rear end, prohibiting the rail to be pushed out from the motor. In the front end 13, a connection piece 46 is attached, which will be discussed more in detail below.

A housing 75 is based on an injection molded piece, comprising the first rail contacting portion 31 and the second rail contacting portion 32. The housing of the present embodiment also comprises protruding support pillars 73 at each corner of the motor 1. The driving elements 20 comprise active volumes 23 of piezoelectric material, i.e. the electromechanically active material, which interacts with the rail 10 via pads 21. The driving elements 20 are in this embodiment smaller than 1 centimeter. The active volumes 23 of the driving elements 20 are attached to a flexible printed circuit board 70 at a respective folded portion 72. The folded portions 72 also present pivot supports 71, on which the spring (not shown) will apply it force. The flexible printed circuit board 70 is supported by the upper surface of the bottom part of the housing 75 and by the support pillars 73. The flexible printed circuit board 70 will be clamped by the cover (not shown), which will be discussed more in detail below. The electrical connections to the driving elements 20 are made through the flexible printed circuit board 70 and are extracted from the center of the motor by a longitudinal portion 74.

Figure 6:
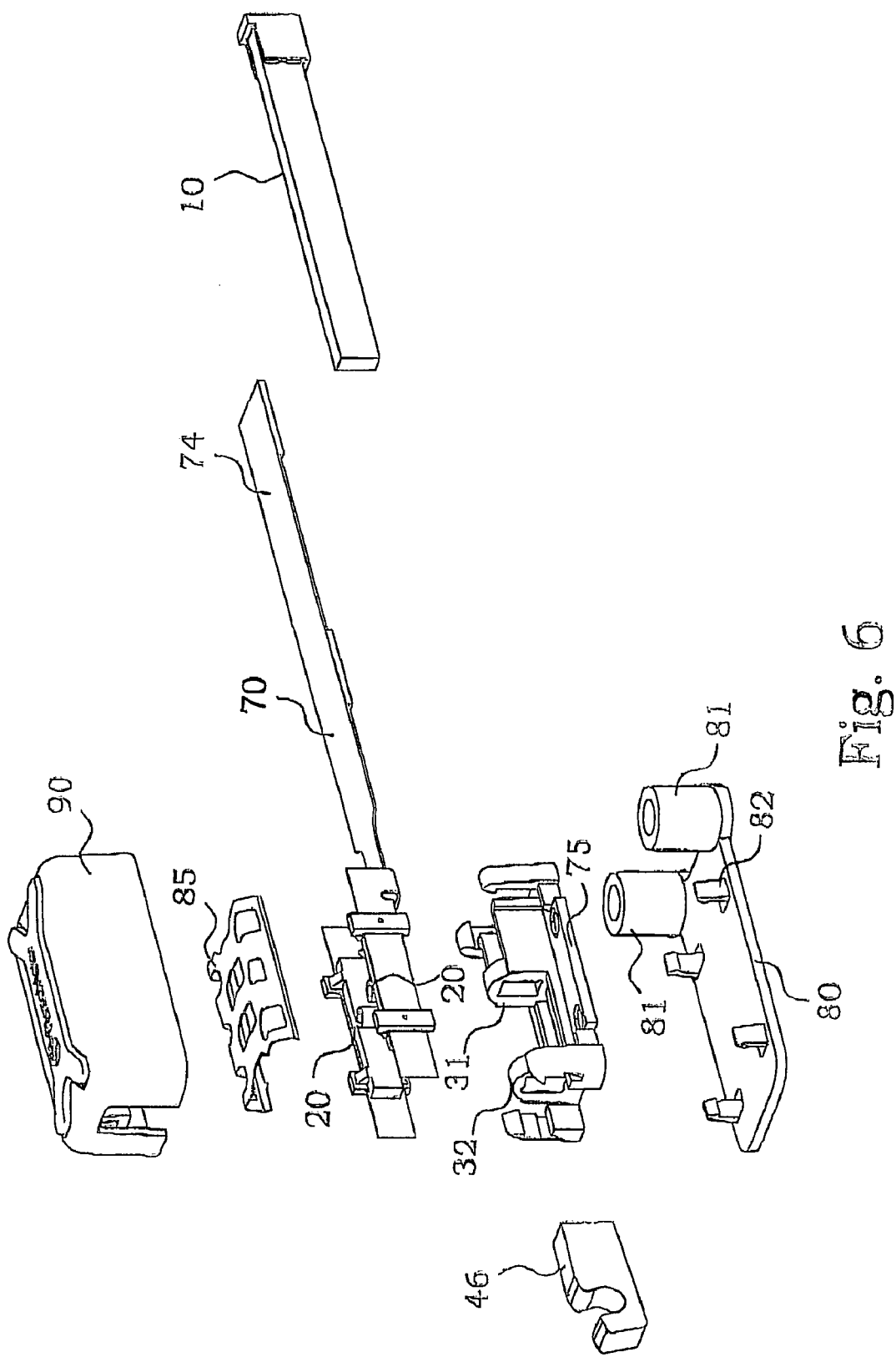
FIG. 6 is an explosion view of the embodiment of FIG. 5.

FIG. 6 illustrates an exploded view of the motor 1 of FIG. 5, now also including a cover 90 and a spring 85. In FIG. 6, the folded shape of the flexible printed circuit board 70 with the driving elements 20 attached is easily distinguished. Likewise, the injection molded housing 75 is easily seen. The figure also comprises a base plate 80, which is to be fastened on a support of the device in which the motor should be operating, by utilizing the screw towers 81. Snap locks 82 are then easily inserted into corresponding openings in the housing, and the motor 1 is easily snapped onto the base plate 80.

The base plate 80 and the screw towers 81 are manufactured to be relatively pliant. The screw towers 81 are furthermore positioned on a minor elevation. Such arrangement allows the base plate to be fastened against a rough surface without causing excessive deformation of the motor housing and bearings. Such excessive deformation would influence the operational conditions of the motor.

The design of the motor 1 is a mixture of modular thinking and integrated manufacturing. The flexible printed circuit board 70 with the driving elements 20 is manufactured in one piece, using standard techniques within electric circuit manufacturing. This facilitates the precision positioning of the different parts of the driving elements, thereby ensuring controlled driving properties. Likewise, the housing 75, including the bearing 30, i.e. essentially the first rail contacting portion 31 and the second rail contacting portion 32, is manufactured in one piece. This ensures a high precision of relative positions and dimensions of the different portions of the housing 75. Most dimensions that are tolerance critical are manufactured in this manner.

However, the separated parts shown in FIG. 6 constitute in another view a base for a modular manufacturing thinking. A number of modules are prepared to fit together and are easily mounted by a few simple operations. Moreover, the different modules can easily be exchanged to other modules for particular purposes. In such a way, for instance driving elements having different driving properties can be provided with a separate flexible printed circuit board and anyway be combined with the other modules. Likewise, if additional features are required, e.g. if a sensor should be used to detect the position of the rail, the base plate 80 can easily be exchanged for a base plate prepared to hold a sensor at the right position.

Figure 7:
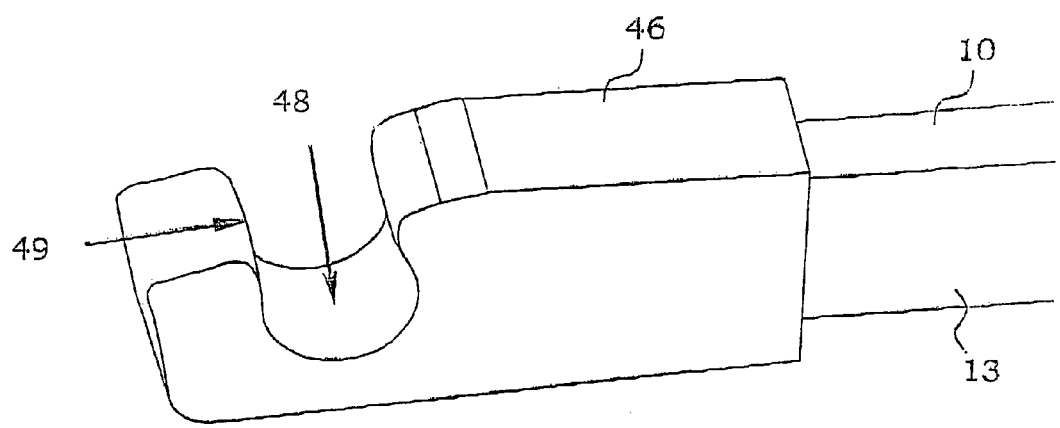
FIG. 7 is a detail illustration of a connection piece of the embodiment of FIG. 5.

FIG. 7 shows a detail illustration of the front end 13 of the rail, together with an embodiment of a connection piece 46. The connection piece 46 is prepared to hold a rod-shaped piece. The connection piece 46 therefore presents a surface 49 defining a hollow volume 48. The hollow volume 48 has a main radius corresponding to the radius of the rod-shaped piece to attach. However, the surface 49 is also curved in the transversal direction, thus giving a smallest radius of the hollow volume 48 at the middle and slightly larger radius at the sides of the connection piece 46. This design resembles to some extent the design of the bearing discussed above, and is provided by similar reasons, i.e. to allow for small amounts of position or directional errors during mounting or operation, in this particular embodiment a directional error of ±3 degrees. Undesired friction effects in the bearing 30 from application related forces and torques are thus reduced.

Figure 8:
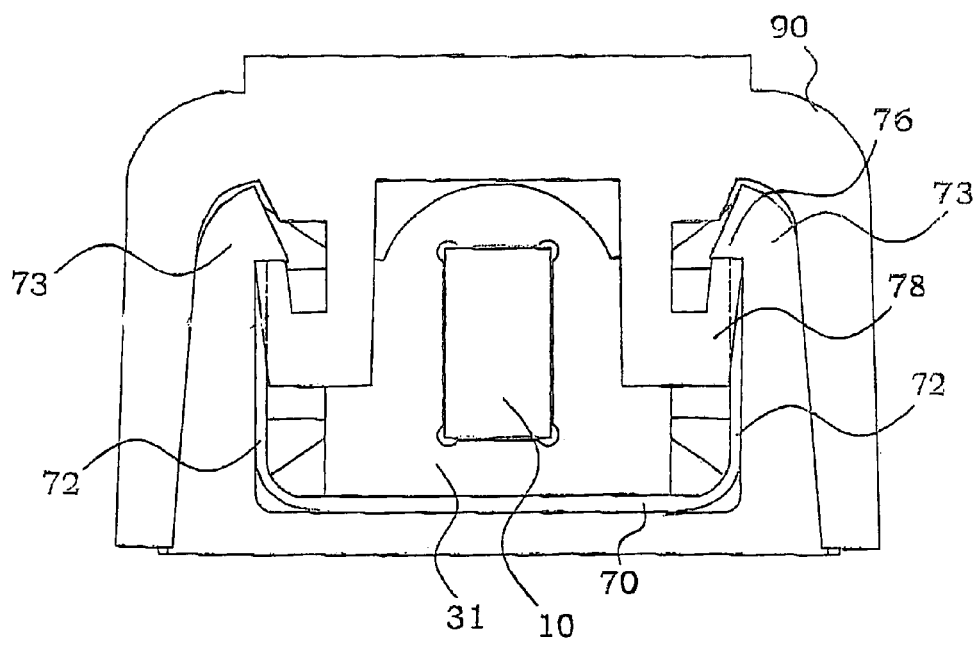
FIG. 8 is a cross-sectional view of the embodiment of FIG. 5, illustrating a flexible printed circuit board being fixed against support pillars.

The mounting of the driving elements relative to the rail also has preferably to involve a certain degree of flexibility. The contact angle between driving element and rail is often critical for a controlled and repeatable operation. Minor faults in dimensions or mounting errors should preferably be correctable by using a certain degree of movement freedom of the driving element. The driving element in the present embodiment is mounted on a flexible printed circuit board. In FIG. 8, the mounting of the flexible printed circuit board is illustrated. This mounting principle provides flexibility to the driving element positioning. As described before, the driving elements are mounted on the surface of folded portions 72 of the flexible printed circuit board 70. The flexible printed circuit board 70 has the property of being flexible in directions transverse to the board plane and rotations around the X-direction, but relatively stiff concerning forces directed in the plane of the board. In particular in such small devices as the motors described here, the stiffness of the flexible printed circuit board 70 becomes very large indeed compared to expected forces on the different portions.

For positioning reasons of the motor, it is required that motions of the driving element parallel to the rail only are due to electromechanical actions. Any displacement flexibility of the driving elements in this direction is therefore unwanted. To this end the folded portions 72 of the flexible printed circuit board 70 are positioned parallel to the rail 10. From FIG. 8 it is easily seen that the folded portions 72 are supported against the support pillars 73 of the housing 75. A protruding edge 76 of the support pillars 73 prohibits the folded portions 72 to move upwards and by utilizing the rigidity of the flexible printed circuit board 70, the flexible printed circuit board 70 is thereby pressed against a bottom part of the housing 75. Since the arrangement is symmetrical, both driving elements are thereby fixated in height, i.e. in the Y direction. The fixation in the X direction can be provided by letting the flexible printed circuit board 70 support against housing 75 or cover portions (not shown). The driving elements are thus almost immovable in both the X and Y directions.

In contrary, as described further above, the driving elements are often required to be somewhat flexible to displacements in the Z direction, as well as to minor rotations around the X axis, in order to compensate for e.g. mounting induced errors. This is also provided by the flexible printed circuit board 70. At the front end of the flexible printed circuit board 70, i.e. at the end closest to the second rail contacting portion 32, there is a small space provided inside of the flexible printed circuit board 70 when mounted against the support pillars 73. The flexible printed circuit board 70 may therefore bend a smaller distance away from the support pillars 73. The spring 85 (FIG. 6) pressing the driving element against the rail 10 is mounted in such a way that a self-centering action is provided to the driving element. Any misalignment of the rail 10 can therefore be compensated by a minor bending or rotation of the flexible printed circuit board. The flexible printed circuit board can also be provided with a reduced width between the pillars 73 and the drive elements to increase the flexibility.

However, in order to have some sort of control of the situation, the rear end of the folded portions 72 of the flexible printed circuit board 70 is fixed against the support pillars 73. Upon mounting, the flexible printed circuit board is simply pressed into a well determined volume, defined by the support pillars 73, the protruding edges 76 and the housing bottom. The shape of the housing 75 will thereby insure that the flexible printed circuit board will be correctly positioned. The basic alignment in the Z direction and rotation around the X axis of the drive elements relative to the drive rail is controlled by the support pillars 73.

The cover 90 is provided with tabs 78 which can be forced between the support pillars 73 and which will snap against the folded portions 72 when coming below the protruding edge 76. The cover 90 is close to the support pillars 73 and stiff enough to prohibit bending of the support pillars 73 due to forces from the tabs 78. The folded portions 72 are thereby clamped against the support pillars 73, prohibiting any motion at all of the folded portions 72. The folded portions 72 are thus kept in position primarily by the protruding edges 76 and then locked by the tabs 78.

The flexibility of the flexible printed circuit board 70 should be adapted to the actual application. A deflection of the flexible printed circuit board 70 will apply forces on the driving elements that are not completely controllable. It has been found that reliable operation can be achieved if the maximum allowed deflection of the flexible printed circuit board 70 could be achieved by a force less than 20% of the spring force by which the driving element is pressed against the rail. Preferably, the force should be less than 10% or even lower.

As mentioned above, in connection with FIGS. 5 and 6, the housing is preferably manufactured as one integral piece. A presently preferred method is to utilize injection molding. The material used in the bearing can be selected in different ways. The bearing of the embodiment of FIGS. 5 to 8 is manufactured in a polymer material. Preferably, the material is a composite material also comprising e.g. glass fibers or other structural enforcing materials. The polymer material can also be provided by friction reducing microparticles e.g. teflon, thereby decreasing surface friction. However, also materials such as softer metals, e.g. aluminium can be possible to use for the housing.

The approach for solving bearing problems, i.e. using dry, sliding bearings without any lubrication, is to a large part connected to the small size of the motors. Gravitational forces caused by e.g. the rail will be almost negligible and the motor can be mounted in any direction without any consideration of gravity. Furthermore, the small size puts corresponding requirements on tolerances. The tolerances then become so strict that conventional approaches to bearing etc. can not be applied directly if the manufacturing costs have to be kept low.

The embodiment of the motor presented in the FIGS. 5 to 8 can in certain applications be provided with additional positioning sensing functionality. A presently preferred way to achieve this is to provide the rail with a surface, having a variable light reflection along the X direction. A light source generates a light signal which is transmitted against a reflection region on the variable light reflection surface. Light reflected from the variable light reflection surface is detected by a light detector and the intensity of the reflected light is measured in comparison with the light intensity emitted by the source. Since the location of the reflection region at the rail is connected to the reflected amount of light, a position of the rail can be determined from the detected reflected light signal.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Electromechanical motor, comprising:
   a rail to be moved;
   a bearing for said rail,
   said bearing being a sliding bearing,
   said bearing having a first rail contacting portion and a second rail contacting portion; and
   a driving member, being arranged to impose a mechanical driving force on said rail,
   said first rail contacting portion being in sliding contact with said rail and arranged for concurrently obstructing displacements of said rail in a first direction transverse to a main extension of said rail, and
   said second rail contacting portion being in sliding contact with said rail and arranged for concurrently obstructing displacements of said rail in said first direction transverse to said main extension of said rail,
   said second rail contacting portion having a contact area against said rail with an extension in a direction of said main extension of said rail that is smaller than a cross-section of said rail perpendicular to said main extension of said rail, whereby said contact area of said second rail contacting portion is in sliding contact with said rail and further arranged for concurrently allowing at least a minor rotation of said second rail contacting portion relative to said rail around an axis transverse to said main extension of said rail.

2. Electromechanical motor according to claim 1, wherein said first rail contacting portion is arranged for obstructing rotation of said rail around an axis parallel to said main extension of said rail.

3. Electromechanical motor according to claim 1, wherein said minor rotation comprises a relative rotation between said rail and said second rail contacting portion around said axis parallel to said main extension of said rail and a relative rotation between said rail and said second rail contacting portion around a first axis transverse to said main extension of said rail.

4. Electromechanical motor according to claim 1, wherein said first rail contacting portion is further arranged for obstructing displacements of said rail in a second direction transverse to said main extension of said rail and transverse to said first direction, and said second rail contacting portion is further arranged for allowing at least a minor relative rotation between said rail and said second rail contacting portion around a second axis transverse to said main extension of said rail.

5. Electromechanical motor according to claim 1, wherein said rail being positioned through a first hollow volume of said first rail contacting portion and a second hollow volume of said second rail contacting portion.

6. Electromechanical motor according to claim 5, wherein said first hollow volume is a first hole and said second hollow volume is a second hole, whereby said first rail contacting portion encircles said first hollow volume and said second rail contacting portion encircles said second hollow volume.

7. Electromechanical motor according to claim 1, wherein said rail has a cross-section with at least one pair of plane-parallel sides, said first rail contacting portion having at least two point contacts with each of the plane-parallel sides.

8. Electromechanical motor according to claim 7, wherein said at least two point contacts are parts of at least a line contact transverse to said main extension of said rail.

9. Electromechanical motor according to claim 8, wherein said at least a line contact is a part of an area contact parallel to said plane-parallel sides.

10. Electromechanical motor according to claim 7, wherein said second rail contacting portion having at least one point contact with each of the plane-parallel sides.

11. Electromechanical motor according to claim 7, wherein an inner surface of at least one of said first rail contacting portion defining said first hollow volume and said second rail contacting portion defining said second hollow volume, being inclined in a direction along said main extension of said rail.

12. Electromechanical motor according to claim 11, wherein said inner surface of at least one of said first rail contacting portion defining said first hollow volume and said second rail contacting portion defining said second hollow volume, being vaulted in a direction along said main extension of said rail.

13. Electromechanical motor according to claim 11, wherein a contact point between said inner surface and said rail is situated at an edge of said first rail contacting portion or said second rail contacting portion.

14. Electromechanical motor according to claim 7, wherein said rail has a substantially rectangular cross section, whereby said first rail contacting portion and said second rail contacting portion have contact points with all plane-parallel surfaces of said rectangular cross section.

15. Electromechanical motor according to claim 14, wherein at least one of said first rail contacting portion and said second rail contacting portion is arranged with a space relative corners of said rectangular cross section.

16. Electromechanical motor according to claim 1, wherein said bearing is a dry, non-lubricated, sliding bearing.

17. Electromechanical motor according to claim 1, wherein said driving member is arranged to impose a mechanical driving force on said rail at a position between said first rail contacting portion and said second rail contacting portion.

18. Electromechanical motor according to claim 1, wherein a motion of said driving member being caused by shape changes of volumes of electromechanically active material.

19. Electromechanical motor according to claim 18, wherein said volumes of electromechanically active material being smaller than 1 cubic centimeter.

20. Electromechanical motor according to claim 1, wherein said first rail contacting portion and said second rail contacting portion are formed as one injection-molded piece.

21. Electromechanical motor according to claim 1, wherein said driving member comprises two driving elements arranged to interact with a respective plane-parallel side of said rail, said driving elements being connected to a flexible printed circuit board, said flexible printed circuit board being fastened against a housing of said electromechanical motor prohibiting motion relative said housing along said main extension of said rail.

22. Electromechanical motor according to claim 21, wherein said flexible printed circuit board is fixed to said housing at one side of said driving elements in said direction of said main extension of said rail, while said flexible printed circuit board is arranged with a minor displacement possibility in a direction perpendicular to said respective plane-parallel side of said rail at an opposite side of said driving elements in said direction of said main extension of said rail.

23. Electromechanical motor according to claim 21, wherein said flexible printed circuit board is fixed to said housing at one side of said driving elements in said direction of said main extension of said rail, while said flexible printed circuit board is arranged with a minor rotation possibility of said drive elements relative said rail.

24. Electromechanical motor according to claim 22, wherein said minor displacement and/or rotation allows for a displacement of said flexible printed circuit board caused by a force that is 20 percent of a force by which said driving elements are pressed against said rail.

25. Electromechanical motor according to claim 22, wherein said flexible printed circuit board is fixed to said housing by snap clamping between a cover portion and said housing.

26. Electromechanical motor according to claim 21, wherein said housing is formed in one piece together with said first rail contacting portion and said second rail contacting portion.

27. Electromechanical motor according to claim 21, wherein said housing has a shape defining a volume in which said flexible printed circuit board is to be mounted, whereby said flexible printed circuit board is positioned in a well-defined position by said volume.

28. Electromechanical motor according to claim 1, further comprising a connection piece for connection of a rod-shaped piece to be attached, said connection piece presenting a surface defining a hollow volume, said hollow volume having a main radius corresponding to a radius of the rod-shaped piece, said surface being further curved in a direction along said rod-shaped piece, whereby minor directional errors are allowed.

* * * * *